Patented Jan. 26, 1932

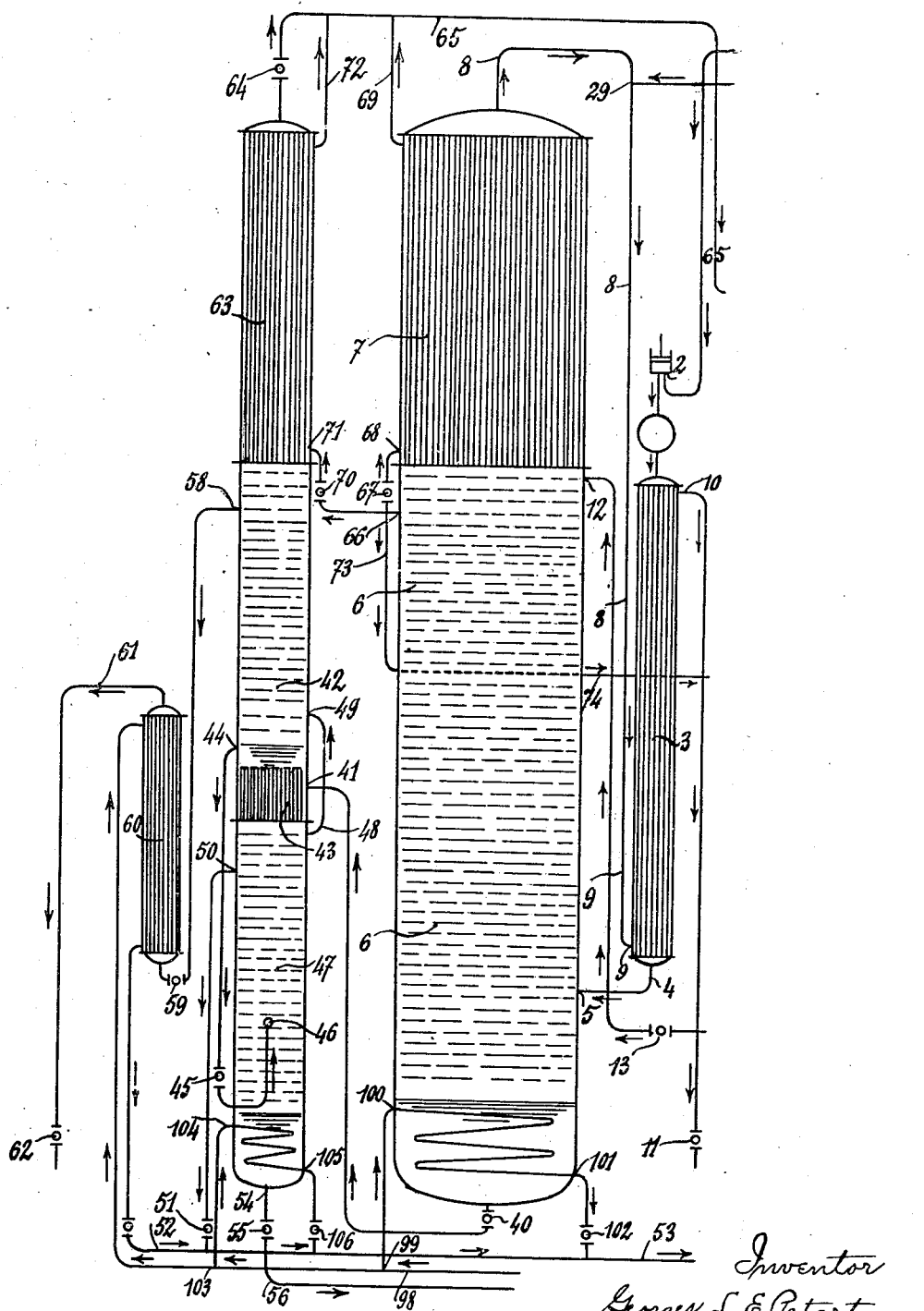

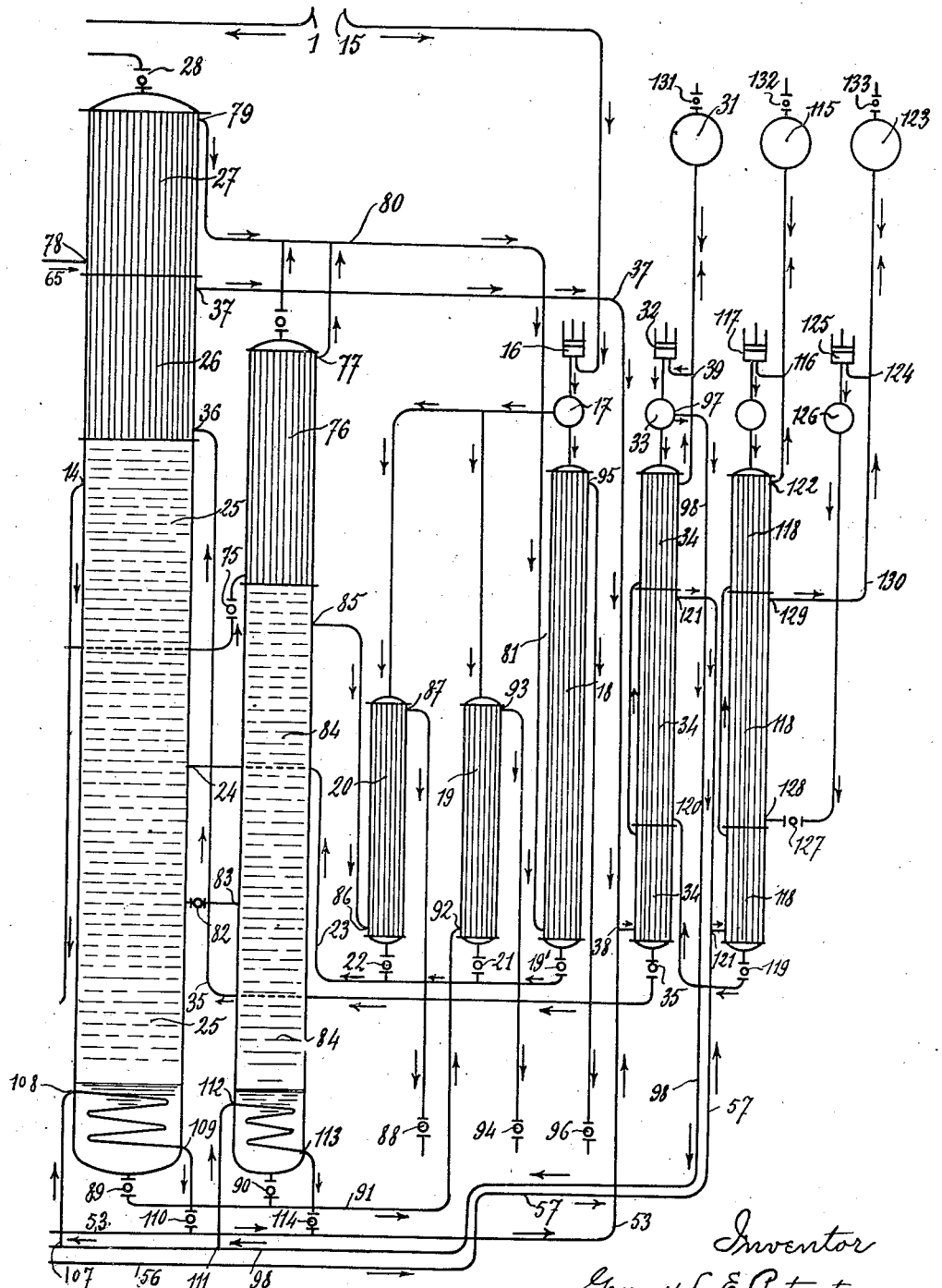

1,843,043

UNITED STATES PATENT OFFICE

GEORGES LÉON EMILE PATART, OF PARIS, FRANCE

PROCESS FOR THE SEPARATION OF THE SEVERAL COMPONENTS OF GASEOUS MIXTURES

Application filed February 5, 1925, Serial No. 7,084, and in France February 13, 1924.

The present invention has for its object a process for the separation of the several components of a gaseous mixture of any kind, or of a plurality of gaseous mixtures treated simultaneously, by liquefaction and rectification.

The said process is particularly advantageous—and this is one of the objects to which the invention chiefly relates—when it is proposed to separate into their components on a large scale, and optionally in a simultaneous manner, the various gas mixtures obtained from the distillation and the oxidation of coal or like solid fuels (coal gas, coke oven gas, water gas, producer gas and the like) which are already enriched with hydrogen by an oxidizing catalysis in the presence of water vapour, and from which it is proposed to extract the hydrogen in the compressed state mingled with a greater or less proportion of nitrogen, in view of the utilization of the same for catalytic syntheses such as that of ammonia, or for the hydrogenating of oils. Since carbon monoxide has a prejudicial action upon the catalysts used for such syntheses, the resulting hydrogen must be free from the same to the maximum degree, and this can be readily effected in accordance with the present invention by the direct use of the pure liquid nitrogen as the liquid for clarifying and cooling purposes.

It is simply necessary, in fact, to employ the principle governing the composition of the vapour disengaged from a liquid mixture at its boiling point, by virtue of which the proportion of the less volatile body is generally smaller in the vapour than in the liquid producing the same; it will result that if a liquid mixture is traversed in the bubbling process by a gas mixture containing a greater proportion of the less volatile component, the liquid will retain a certain proportion of the latter while evaporating in its stead, calorie for calorie, a corresponding proportion of a more volatile component. Based upon this principle, the process constituting one of the features of the present invention consists essentially in interposing in the path of the gas mixture from which the carbon monoxide is to be eliminated, a liquid containing a smaller proportion of this gas than what is contained in the gas mixture, so that the said liquid will retain—when the gas is circulated through it—a certain proportion of the carbon monoxide, evaporating in its stead a corresponding proportion of a more volatile substance entering into the composition of the liquid. If this operation is repeated systematically a certain number of times, one will be enabled to reduce the amount of carbon monoxide in the gas mixture to as low a figure as may be desired.

However, only a single product can be practically found which is more volatile than carbon monoxide and can also be liquefied, this being nitrogen, and it is employed according to the present invention as a purifying liquid and is substituted in the gas mixture under treatment, calorie for calorie, for the carbon monoxide eliminated; but it happens precisely that from the present standpoint the nitrogen will as a rule have no prejudicial action upon the catalysts and that in certain cases—and one of the most important i. e. the synthesis of ammonia—it even constitutes one of the elements whose presence is essential in the gas mixture. The process according to the present invention therefore consists in displacing carbon monoxide by nitrogen, the latter offering none of the serious inconveniences attended by the use of the former. The said displacement can be readily effected in a rectifying column which is provided with a sufficient number of bubbling plates through which the gas mixture ascends and upon the upper plate of which the liquid nitrogen is poured in a continuous manner and in a suitable quantity; this liquid will flow from plate to plate in the contrary direction to the gas to be purified, and it becomes progressively charged with the carbon monoxide removed from the gas mixture. All the various devices and outfit employed and approved in practice for the rectification of volatile liquids or liquefied gases may be called into requisition for the said purpose.

The liquid nitrogen is obtained according to the present invention by the combination of various successive cycles of operation.

In each of the said cycles a suitably chosen fluid is compressed and liquefied, and the cold which results from its evaporation is completely utilized for the liquefaction of the fluid employed in the succeeding cycle, up to the point at which the resulting temperature is sufficiently low to be utilized for the cooling of the rectifying column.

An analogous method has been in use by various scientists even since the first attempts to liquefy gases, and chiefly by Mr. Pictet, under the designation of "multiple cycle" process or "process for series cooling", but in an imperfect manner, and in particular by the use of evaporating pressures below atmospheric pressure, this offering numerous inconveniences.

Theoretical considerations will readily show how far the said system of multiple cycles is superior to the single cycle system.

The substitution of successive evaporations for the simple or multiple expansion of a gas will afford a much greater efficiency in practice, so that the improvement actually obtained is thus, to an additional degree, considerably augmented over what is indicated by theory, thereby offering a saving in power which may attain four-fifths of the consumption of power in the known processes.

In the present invention, the cycles successively employed are as follows.

The first cycle utilizes the liquefaction and the evaporation of ammonia gas whose boiling point is $-50°$ C. at atmospheric pressure and whose critical temperature is $132°$ C. or carbonic anyhydride whose boiling point is $-79°$ C. at atmospheric pressure and whose critical temperature is $31.35°$ C.

The second cycle utilizes ethylene gas whereof the boiling point is $-104°$ C. at atmospheric pressure and the critical temperature $9.5°$ C.

The third cycle utilizes methane gas whereof the boiling point is $-164°$ C. at atmospheric pressure and the critical temperature $-81.8°$ C.

The fourth cycle utilizes nitrogen gas whereof the boiling point is $-195.7°$ C. at atmospheric pressure and the critical temperature $-146°$ C. This may in certain cases be replaced by carbon monoxide whereof the boiling point is $-190°$ C. at atmospheric pressure and the critical temperature $-139.5°$ C.

As will be observed, the boiling point of the gas for each cycle is below the critical temperature of the gas for the succeeding cycle, and this will permit the liquefaction of each gas by means of the evaporation, at a pressure somewhat above atmospheric pressure, of the gas liquefied during the preceding cycle, and this constitutes in fact the precise object of the invention. The maintenance of the evaporation pressure at a point which is always somewhat above atmospheric pressure will offer the advantage of preventing all access of air which might cause explosions with combustible gases such as ethylene and methane. Each of the said cycles is connected with the preceding by a tubular temperature-exchanging device which is so disposed that the gases will be discharged therefrom as nearly as possible at the room temperature, thus reducing the frigorific losses to a minimum.

Furthermore, a new and important improvement from an economical standpoint will be obtained if in the above-mentioned series of operations, the last cycle of compression and liquefaction of the pure nitrogen is replaced by a more complex operation comprising the compression of atmospheric air, its liquefaction, rectification, and finally its separation to a more or less complete degree into its elements which are thus obtained in the liquefied state; these latter (or certain of the same) may be employed wholly or partially, by their evaporation, as sources of cold for the rectification and the separation of other gaseous mixtures or as clarifying liquids in this latter operation, or for any other analogous operation, or for like manufacturing purposes.

This method of operating enables the utilization of the expenditure of the energy corresponding to the compression of the fluid in the last cycle not only for the frigorific capacity resulting from its liquefaction and its evaporation and for the use which is to be made of the same, but also for the separation of the fluid itself into its elements (if it consists of a mixture as in the case of atmospheric air) and for the utilization, as by-products, of these separated elements. Thus according to the said method the use of liquid nitrogen as a frigorific element or an element of combination, will be associated—without any additional expenditure of energy—with the preparation of pure or nearly pure oxygen and of pure or nearly pure argon whereof the cost of production will thus be practically nil, whilst the compression given thereto can be utilized for the storage into steel bottles.

In these conditions the atmospheric air is compressed at a suitable pressure which is usually above 25 atmospheres; after cooling by an exchange of temperature with the discharged gases it is circulated into a rectifying column which is maintained at the same pressure and whereof the upper part is cooled by a condenser, said column being supplied with liquefied methane boiling at atmospheric pressure or slightly above the latter, the lower part of the said column being heated by the same methane which is compressed but is not as yet liquefied and is more or less cooled. This will produce pure liquid nitrogen in the upper plates of the said column and liquid oxygen in the lower plates; either of these gases may be employed separately as liquids for cooling by their evaporation, or as clarifying liquids, for the separation (by rectification) of other gaseous mixtures or after a suitable heating, as compressed gases which are to be stored in bottles.

In the first-mentioned case, if the question relates solely to the separation of the gas mixtures into their component parts, the arrangement will comprise firstly the compressed gaseous methane as well as a source of heat for heating the rectifying column, and secondly the methane, as well as liquefied nitrogen and oxygen, employed in connection with cooling means having a constantly increasing efficacity whereby the complete rectification of gaseous mixtures of the most varied character may be effected.

Furthermore, the components of the coal gas employed, other than hydrogen, may be separated singly during the rectification of these latter, and a suitable use for the said components will be readily found, firstly, and for certain of the components, for compensating the necessary losses of the frigorific agent used in the cooling cycles (methane and ethylene) secondly for the preparation of additional quantities of hydrogen (carbon monoxide), and lastly, both of the said components can be employed as combustibles having special and characteristic properties.

In order to clearly set forth the characteristic features of the process according to the said invention, the use of the same will be indicated in detail by way of example for the preparation of a mixture of hydrogen and nitrogen, entirely free from carbon monoxide, by the extraction of this product from a coal gas such as illuminating gas or coke oven gas, mingled or not with water gas, and subjected to catalysis (or not) in view of a subsequent addition of hydrogen. The present example is given solely as an indication of the present process and is not to be considered as limiting the scope of the said invention, which latter is equally applicable to other gaseous mixtures and further comprises numerous modifications of the embodiment illustrated in the appended drawing which shows diagrammatically one form of apparatus adapted to carry out the process.

With reference to the said drawing, the gas mixture under treatment, which has been preliminarily subjected to the normal purifying operations such as extraction of the tar, ammonia and benzol and from which the water vapour and carbonic acid gas have been removed as far as possible, is withdrawn at (1) by the compressor (2) which brings it to a suitable pressure, this depending upon the proportion of nitrogen which is to finally remain in the mixture. The gas which has been compressed at (2) and brought to the room temperature by means of a water circulation device, is circulated through the temperature-exchanging apparatus (3) from which it is discharged at (4) after having been cooled by contact with the gases issuing from the rectifying apparatus (6) and traversing the said temperature-exchanging apparatus in the contrary direction according to 9 and 10. The gas in the compressed and cooled state then passes through (5) into the rectifying apparatus (6) which consists of a column containing suitable gas bubbling plates which are provided with all the necessary improvements whereby the maximum contact between the gases and the liquids will be provided. The rectifying apparatus (6) is well cooled at the top by the condenser (7) and is heated at the bottom by the circuit (100—101). The said gases are circulated upwardly through the apparatus and thus become rectified.

Under the action of an abundant downward circulation of liquid nitrogen which is effected by the condensation at (7) as well as by the supply of the liquid nitrogen at (12) as will be set forth hereunder, the upper part of the condenser at (8) will only receive hydrogen which is mingled with the proportion of nitrogen corresponding to the pressure prevailing in the said column and to the degree of cooling in the condenser (7). The gas discharged at (8) is circulated through (8, 9) into a temperature-exchanging device (3) which it traverses according to (9, 10) and is discharged through (10) as far as the valve (11) which may serve to regulate the output and consequently the pressure in the column (6).

The liquid nitrogen employed for the downward flow is supplied at (12) by the siphon (14, 13, 12) whose output is controlled by the valve (13); the said nitrogen is supplied by the column which serves for the rectification of the atmospheric air (25) and whereof the operation is as follows.

The air which is to be treated in the said column, after being freed from the water vapour and the carbon dioxide which it contains, is supplied at (15) and is then compressed by the compressor (16) to a point above 25 atmospheres and is cooled at (17) by a water circulation; it then traverses simultaneously, a plurality of cooling devices (18, 19, 20) wherein it recuperates the cold withdrawn by the various gases issuing from the rectifying apparatus (nitrogen, oxygen, argon) before they are finally discharged to the exterior. The air which is thus cooled issues from the said cooling devices through the cocks (19', 21, 22) which serve to distribute the supply of air between the said cooling devices, and is circulated through a single conduit as far as the point (24) at which point it enters the rectifying column (25). This latter is cooled at the top by two superposed condensers (26 and 27) and is heated at the bottom by the circuit (108, 109). The nitrogen becomes rectified as it rises in the column (25), under the effect of the active back flow which is produced by the upper condensers (26, 27), so that it will attain the upper plates in a perfectly pure state. From one of the latter plates, suitably selected, is withdrawn at (14) the liquid nitrogen which serves as above stated for the clarifying of the mixture of hydrogen and nitrogen attaining the top of the column (6).

A suitable outlet (28) is provided at the top of the column (25) and above the condensers, for the discharge of the non-condensable gases contained in the air (hydrogen, helium and the like) and also of a certain amount of nitrogen which may be optionally added at (29) in the proper portion, to the gas mixture discharged at (8) in order to give the said mixture the desired composition.

The cooling of the upper part (26), which is necessary for the rectifying process and for the obtaining of pure nitrogen is effected by means of a refrigerating apparatus based upon the use of methane which is operated in the following manner. The methane gas is withdrawn at (39) from the tank (31) into the compressor 32 whose discharge conduit is cooled at (33) by a water circulation, a branch pipe delivers a certain part of the compressed methane into the heating and cooling device (34) wherein the compressed gas is subjected to a systematic cooling firstly by the cold methane issuing from the said columns and secondly by the liquid ethylene evaporating at atmospheric pressure and obtained from a preceding cycle of liquefaction. The methane is discharged in the completely liquefied state from the cooling device (34) through the expansion valve (35) and it enters through (36) into the condenser (26) of the column (25); evaporation of the same takes place at a pressure near atmospheric pressure, thereby condensing the compressed nitrogen attaining the top of the said column. The evaporated methane is discharged from the condenser (26) through the conduit (37) and then enters the bottom of the cooling device (34) whereof it traverses two sections which are separated by the section corresponding to the condensation by the ethylene, in such manner as to afford a systematic cooling. The methane which is heated and is subjected to expansion will now return through (39) to the suction end of the compressor (32).

In the column (6) the gases other than hydrogen, and a certain proportion of the nitrogen accompanying the hydrogen, i. e. the excess of nitrogen, as well as the carbon monoxide and the hydrocarbons—these latter consisting almost exclusively of methane and ethylene—are driven back by the abundant backward circulation of the nitrogen supplied to the upper plates both by the condensation at (7) and by means of the external apparatus (12), the same being circulated in the backward direction towards the lower part of the column in which they accumulate after the entire removal of the hydrogen therefrom by the heating of the circuit (100, 101). They are discharged through the valve (40) and are separated in a double rectifying column consisting of two superposed sections (42 and 47); they are then circulated (through 41) into the lower part of the upper section (42) wherein they are evaporated by the set of tubes (comprising tubes with closed ends) heated by the gas supplied from the lower section of the column; they rise thence into (42) and become rectified under the action of the back circulation produced by the upper tubular condenser (63), the nitrogen is discharged in the gaseous state, as the first offtake product, at the top of the condenser through (64).

The liquid carbon monoxide flows down from one of the upper plates through (58) whilst the hydrocarbons (methane and ethylene) circulate through the siphon (44, 45, 46) into the middle part of the lower section of the column (46); they become rectified therein under the action of the heating current (104—105). The first offtake products which they still contain (nitrogen and carbon monoxide) will return through (48, 49) into the upper section (42) of the double column; the methane is discharged in the liquid state through (50) whilst the ethylene collects at the bottom, whence it is collected by means of (54, 55) and is discharged at (56, 57) into the cooling device of the ethylene refrigerating machine (118) which constitutes the third circuit of the plant. The excess of methane and of ethylene will collect in the respective tanks (31 and 115) from which they are withdrawn by means of the valves (131 and 132); the carbon monoxide which is discharged at (58) and whereof the output is regulated by the valve (59) is heated in the temperature-exchanging device (60) in contact with the compressed methane, which it cools, and is discharged at (61) and attains the valve (62) wherein it may expand and may thus be returned to the apparatus for the hydrogenating catalysis, or may be used for purposes of combustion.

The resources consisting of methane in the hot and cold state and of liquefied nitrogen which are available in the said plant will enable the use of a special column for the extraction of the argon and the complete purifying of the oxygen. For this purpose, a suitable amount of the liquid is withdrawn at a point near the middle part of the air-rectifying column (25) at which point the argon is concentrated to the maximum degree; the said liquid is regulated by the cock (82) and is circulated through a conduit (83) which should have the form of a siphon—although it is shown in the figure as straight, for the sake of clearness—into a small special rectifying column (84) which is provided with an upper condenser (76) and with a lower heating circuit (112, 113). The gases will be rectified therein; the gaseous nitrogen is discharged through the condenser as a first offtake product, and the argon which has been purified by the back flow is withdrawn in the liquid state at (85); the oxygen, from which the nitrogen and the argon have been removed, is discharged in the pure state at the lower part of the apparatus at (90).

The remaining portions of the plant will be readily observed by referring to the figure. The circuit of the cooling machine employing ethylene, which serves to liquefy the methane, is shown at (115, 116, 117, 118, 119, 120, 121, 122, 115).

The ethylene contained in the tank 115 is compressed by the compressor 117; it traverses the condenser and enters the column 118, acting as a temperature-exchanging refrigerant (being liquefied therein); it flows thence through the expansion valve 119 and enters at 120 into the column 34 in which it serves to liquefy the methane, and passes thence through the pipe 121 and traverses the column 118 a second time in order to cool the ethylene which enters the same; it is then discharged through the orifice 122 and returns to the tank 115.

The circuit of the ammonia refrigerating machine, which serves to liquefy the ethylene, is shown at (123, 124, 125, 126, 127, 128, 129, 130, 123).

The ammonia gas contained in the tank 123 is compressed by the compressor 125 and is liquefied by a water circulation in the condenser 126; it then expands in the valve 127 and enters the column 118 wherein it is circulated upon the outer surface of the set of tubes; it then proceeds through the pipe 129 and the pipe 130 and returns to the tank 123. The opening of the valve 127 is so regulated that the ammonia gas will be maintained at a constant level in the apparatus and that the gas will be evaporated at a pressure slightly above atmospheric pressure the variations of the said pressure being readily attenuated by means of the regulating tank 123.

The said columns are in all cases heated at the bottom by a circulation of compressed methane (97, 98) flowing through (111, 112, 113, 114) into the boiler of the argon column; through (107, 108, 109, 110) into the boiler of the air column; through (99, 100, 101, 102) into the bottom of the main column; through (103, 104, 105, 106) into the bottom of the hydrocarbon column; and through (103, 50, 62) into the temperature-exchanging device serving to heat the carbon monoxide. The valves (51, 106, 102, 110, 114) serve to regulate at will the degree of these different heatings, and the fluid is returned therefrom through (52, 53, 38) into the refrigerating device (34) of the methane cooling machine. In this manner, each column is provided with a source of heat whose intensity may be regulated as desired.

Furthermore, the liquid nitrogen under pressure, which has been employed for the back flow in the column (6), is discharged therefrom at (66), at which point it will be advantageous to dispose a regulating bottle—not shown—provided with a plurality of conduits respectively supplying the condensers (7, 63, 76) of the three columns (6, 42, 84). The nitrogen which expands in the said condensers is collected in a single conduit which terminates in the upper condenser (27) of the column (25), thus completing the action of the condenser (26) and attaining—through (80, 81) the temperature exchanging device (18) in which the atmospheric air under treatment is cooled.

If the said apparatus are properly protected against heat from the exterior, and if the tubular elements of the said heat-exchanging devices have a sufficient length and are suitably arranged, the heat losses will be a minimum and the amount of methane to be liquefied will be very small.

Furthermore, the said plant will afford; at (11):—compressed hydrogen containing 5-25 per cent of nitrogen according as the pressure in the column (6) is maintained between 30 and 5 atmospheres and is free from carbon monoxide; at (94):—compressed oxygen; at (96):—nitrogen in the expanded state, contaminated by a small amount of carbon monoxide; at (88):—argon under pressure; at (62):—carbon monoxide contaminated by a small amount of nitrogen; at (131):—methane which is in the expanded state, but which might be obtained—wholly or partially—in the compressed state; at (132):—ethylene.

The separation of the components of the air and of the mixture under treatment will thus be effected to the maximum degree in the plant above specified.

Analogous arrangements may be provided, according to the process forming the subject-matter of the present invention, which are adapted for the treatment of any suitable gaseous mixture.

What I claim is:—

1. A process for the separation of the constituent parts of a gaseous mixture resulting from the distillation of fuel, consisting in the circulation of the said mixture in a liquefying and rectifying column; in the liquefaction and the rectification of atmospheric air in another rectifying column; in circulating the liquid nitrogen obtained from the upper plates of the last-mentioned column into the column serving for the rectification of the gaseous mixture in order to displace the carbon monoxide therefrom; in the liquefaction of ethylene by the evaporation of ammonia;

in the liquefaction of methane by the evaporation slightly above atmospheric pressure of the said ethylene; in the circulation of the said liquefied methane into the column serving for the rectification of the air in order to effect the liquefaction of the air; in the rectification of the liquid discharged from the bottom of the main column serving for the rectification of the gaseous mixture in order to separate therefrom the methane and the ethylene in such manner that the same can be substituted for the methane and the ethylene employed for the liquefaction of atmospheric air by the multiple cycle process.

2. A process as claimed in claim 1 for the elimination of the carbon monoxide from the gas mixture by means of the descending current of liquid nitrogen, characterized by the fact that the bottom of the said column is simultaneously heated by circulating in a conduit a liquefiable gas such as methane or ethylene obtained from the gas mixture.

3. The art of separating the constituents of fuel gas mixtures, which comprises liquefying and rectifying the mixture, liquefying and rectifying atmospheric air and separating the liquid nitrogen, and absorbing carbon monoxide from said liquefied gases by the liquid nitrogen, separating liquefied hydrocarbon gases from said liquefied gases, cooling the air during liquefaction by evaporating one of the liquefied hydrocarbon gases, and discharging hydrogen from the liquefied rectified fuel gas mixture.

4. The art of separating the constituents of fuel gas mixtures, which comprises liquefying and rectifying the mixture to obtain separately nitrogen, hydrocarbon gases and carbon monoxide in liquid form while liberating hydrogen, liquefying and rectifying atmospheric air and supplying the resultant liquid nitrogen to said gases for absorption of carbon monoxide, separating liquid oxygen containing argon from the liquefied air, separating the argon and heating the separated argon by a portion of the air to be liquefied, and separately evaporating the liquid oxygen by another portion of the air to be liquefied, evaporating one of the liquefied hydrocarbon gases and re-liquefying it by the aid of another of the hydrocarbon gases, for the liquefaction of the air.

5. A process for the separation of the components of a gaseous mixture by liquefaction and rectification which consists in rectifying the said mixture and liquefying it in one or more rectifying columns with liquid nitrogen, rectifying atmospheric air to obtain the nitrogen as a liquid and in a pure state on the upper plates of another column and supplying it to the gas mixture rectifying column, the air being liquefied by evaporating liquid ammonia at a pressure slightly above atmospheric pressure in order to effect the liquefaction of ethylene; evaporating the liquid ethylene at a pressure slightly above atmospheric pressure and liquefying methane thereby, evaporating said methane at a pressure slightly above atmospheric pressure and liquefying atmospheric air thereby to obtain liquid nitrogen upon the upper plates of a rectifying column by the action of a refrigerating condenser traversed by the said methane evaporated therein.

6. A process for the separation of the constituents of a gaseous mixture resulting from the distillation of fuel, which consists in rectifying the said mixture in one or more columns to separate the mixture into its components, liquefying and rectifying atmospheric air at the same time in another rectifying column to obtain liquid nitrogen upon the upper plates of the latter rectifying column, which liquid nitrogen serves to rectify the gas mixture, rectifying the atmosphere air first by evaporating ammonia above atmospheric pressure to liquefy ethylene, evaporating said ethylene above atmospheric pressure to liquefy methane, and evaporating the methane above atmospheric pressure to liquefy the air, heating the lower part of the distilling columns employed for these different operations by means of the same methane which has been used for the liquefying of the atmospheric air.

In testimony whereof I have signed this specification.

GEORGES LÉON EMILE PATART.